United States Patent [19]

Beumer et al.

[11] Patent Number: 5,060,558
[45] Date of Patent: Oct. 29, 1991

[54] MACHINE FOR BREWING COFFEE, TEA AND THE LIKE

[75] Inventors: Klaus Beumer; Hans-Jürgen Precht, both of Solingen, Fed. Rep. of Germany

[73] Assignee: Robert Krups Stiftung & Co. KG., Solingen, Fed. Rep. of Germany

[21] Appl. No.: 473,879

[22] Filed: Feb. 2, 1990

[30] Foreign Application Priority Data

Feb. 14, 1989 [DE] Fed. Rep. of Germany ....... 3904376

[51] Int. Cl.⁵ ..................... A47J 31/02; A47J 31/057
[52] U.S. Cl. ........................................ 99/306; 99/300; 99/295
[58] Field of Search ............... 99/300, 304, 302 R, 99/306, 307, 295, 288, 281; 426/433; 137/519.5, 533.13

[56] References Cited

U.S. PATENT DOCUMENTS

| | | | |
|---|---|---|---|
| 4,356,382 | 10/1982 | Keramati et al. | 99/307 |
| 4,558,640 | 12/1985 | Marchant | 99/300 |
| 4,630,532 | 12/1986 | Sonnentag et al. | 99/279 |
| 4,683,812 | 8/1987 | Tarlow et al. | 99/306 |
| 4,748,901 | 6/1988 | Burmeister | 99/306 |
| 4,790,240 | 12/1988 | Henn et al. | 99/282 |
| 4,888,465 | 12/1989 | Hoffmann | 99/307 |

FOREIGN PATENT DOCUMENTS

| | | | |
|---|---|---|---|
| 3615683 | 11/1987 | Fed. Rep. of Germany | 99/323.3 |
| 3709268 | 9/1988 | Fed. Rep. of Germany | 99/302 R |
| 0671326 | 8/1989 | Fed. Rep. of Germany | 99/288 |
| 2125276 | 3/1984 | United Kingdom | 99/288 |

Primary Examiner—William A. Cuchlinski, Jr.
Assistant Examiner—John L. Beres
Attorney, Agent, or Firm—Peter K. Kontler

[57] ABSTRACT

A machine for brewing coffee, tea or other hot beverages has a hollow base with a top wall beneath the bottom wall of a container for fresh liquid. The top wall has a recess for two annular sealing elements, and the top wall portion beneath the recess has two downwardly extending sleeves. The base confines an electric heater having a liquid admitting inlet connected with one of the sleeves by a first conduit and a liquid discharging outlet connected with a riser in the container by way of a second conduit. The upper end portion of the first conduit extends through the respective sleeve and into the lower part of the corresponding sealing element, and such upper end portion constitutes a cage for the spherical valving element of a check valve which permits fresh liquid to flow from a first nipple of the container toward the inlet of the heater but prevents heated liquid from flowing back into the container. The container has a second nipple which communicates with the lower end of the riser and with the upper end portion of the second conduit. The nipples extend into the corresponding sealing elements.

15 Claims, 3 Drawing Sheets

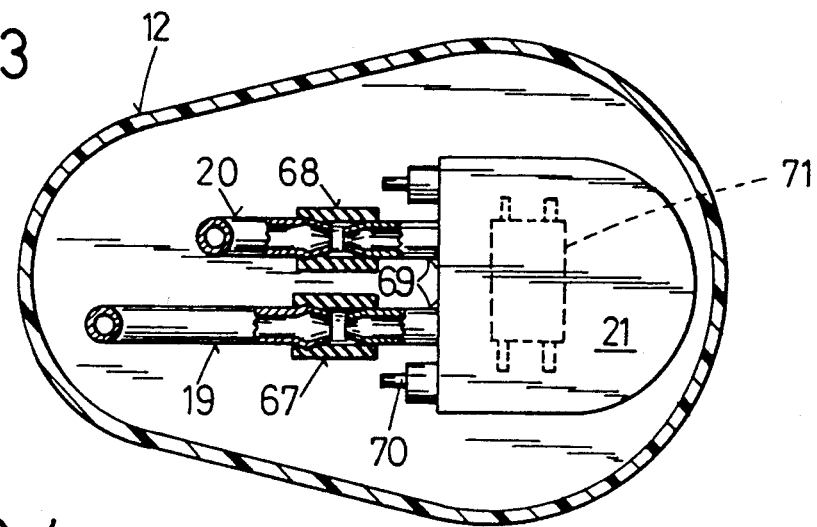
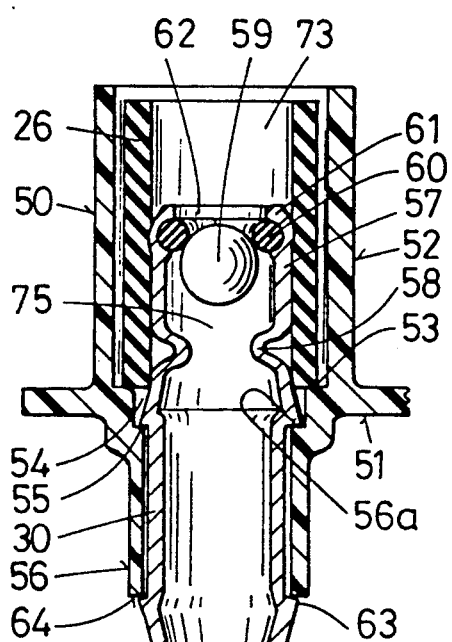
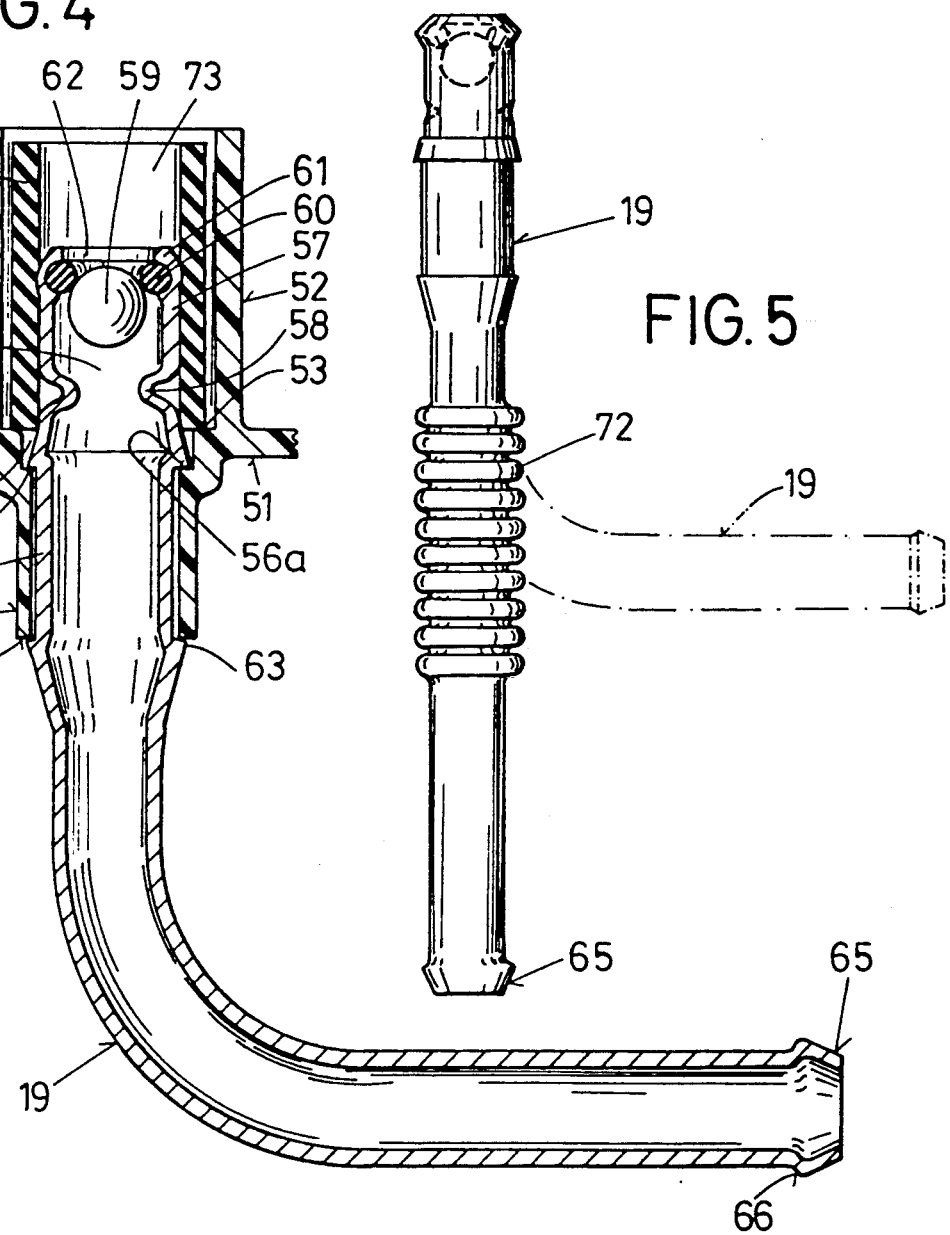

MACHINE FOR BREWING COFFEE, TEA AND THE LIKE

BACKGROUND OF THE INVENTION

The invention relates to machines for brewing coffee, tea or other hot beverages, and more particularly to improvements in machines of the type wherein a liquid storing and dispensing container is mounted adjacent a hollow base or housing for confinement of an electric heater and of conduits which connect the inlet and the outlet of the heater with the container.

It is already known to provide a coffee maker or an analogous machine with a container which is mounted on top of a hollow base and confines a riser for hot liquid. The riser serves to receive hot liquid from the outlet of the heater and to admit the liquid into a filter holder wherein the liquid contacts a metered quantity of flavoring agent, such as pulverulent cocoa or chocolate, tea leaves or ground coffee beans. As a rule, the electric heater is a so-called through flow heater wherein a pipe defines an elongated path for the flow of liquid from the inlet to the outlet. The inlet receives fresh liquid from a first nipple of the container by way of a first conduit, and the outlet supplies heated liquid to a second nipple of the container by way of a second conduit. The second nipple admits hot liquid into the lower end of the riser in the container. Examples of such machines are coffee makers known as "BREWMASTER JR.", "BREWMASTER" and "BREWMASTER II" which are produced and distributed by the assignee of the present application.

A check valve is normally installed in the path of flow of fresh liquid from the container to the inlet of the electric heater to prevent return flow of hot liquid and/or steam into the container by way of the first nipple, for example, when the pressure of heated liquid in the heater rises to or exceeds a given value The base of the machine can be equipped with a warming plate for a vessel (e.g., a coffee pot) which is located beneath the filter holder and serves to receive the freshly brewed beverage.

The check valve is open in normal operation of the machine and permits fresh liquid to flow from the container by way of the first nipple, thereupon through the heater, into and upwardly through the riser and thence into the filter holder. A drawback of presently known machines which employ such check valves is that the valves contribute excessively to overall cost of the machines. As a rule, the check valve is a separately produced part which is installed in the path for the flow of fresh liquid from the container into the inlet of the electric heater. The separately produced valve is installed in the conduit between the first nipple of the container and the inlet of the heater or upstream of such conduit. The valve has a cage for a spherical valving element, and the cage must be installed in or ahead of the aforementioned conduit between the container and the inlet of the electric heater in a time-consuming operation.

OBJECTS OF THE INVENTION

An object of the invention is to provide a machine wherein the making and installing of the valve can be carried out at a lower cost and within shorter intervals of time than in accordance with heretofore known procedures.

Another object of the invention is to provide a machine which need not be equipped with a separately produced check valve even though it is capable of preventing return flow of heated liquid from the heater into the container.

A further object of the invention is to provide a novel and improved housing for use in the above outlined machine.

An additional object of the invention is to provide a novel and improved conduit for use in the above outlined machine.

Still another object of the invention is to provide a machine wherein the housing (such as a hollow base) can be fully assembled with the components which are to be installed therein or thereon prior to establishment of a connection between the housing and the liquid storing and dispensing container.

SUMMARY OF THE INVENTION

The improved machine can be used to brew coffee, tea or other hot beverages and comprises a hollow base including a top wall the upper side of which is provided with at least one recess. The top wall includes a bottom portion beneath the recess, and the bottom portion has first and second openings. The machine further comprises first and second annular sealing elements which are disposed in the recess in register with the respective openings, a liquid storing and dispensing container including a bottom wall which is adjacent the top wall and has first and second nipples extending into and sealingly engaging the respective (first and second) sealing elements, an electric heater which is disposed in the base and has a liquid admitting inlet and a liquid discharging outlet, a first conduit having a first end portion connected with the inlet of the heater and a second end portion in the first sealing element, a check valve which is provided in the top wall and includes the second end portion of the first conduit, a second conduit having a first end portion connected to the outlet of the heater and a second end portion in the second sealing element, and a riser which is provided in the container and has a liquid-receiving lower end in communication with the second nipple.

The second end portion of the first conduit defines a compartment, and the valve includes a valving element (preferably a spherical valving element) in the compartment. The second end portion of the first conduit comprises a circumferentially complete annular wall which surrounds the compartment and has at least one stop projecting into the compartment between the valving element and the first end portion of the first conduit. The annular wall preferably further includes an inwardly extending collar defining a liquid admitting opening between the first nipple and the valving element. The inner diameter of the collar can exceed the diameter of the spherical valving element, and the valve then further comprises an annular seat which is disposed in the compartment adjacent the collar and has an inner diameter less than the diameter of the valving element.

The at least one recess can be disposed substantially centrally of the top wall, and the bottom portion of such top wall can be provided with first and second sleeves beneath the respective openings in the bottom portion. The second end portions of the first and second conduits then extend through the respective sleeves. The sleeves can be provided with internal shoulders and the second end portions of the conduits can be provided with external shoulders which rest on the respective internal shoulders. The conduits can be provided with additional external shoulders which abut the lower end faces of the respective sleeves. The bottom portion of the top wall can be provided with abutments for the sealing elements in the recess.

In accordance with a modification, the inwardly extending collar at the upper end of the second end portion of the first conduit (above the compartment for the valving element) can comprise arcuate sections which alternate with slots. Such collar can have an inner diameter less than the diameter of the valving element so that the collar can serve as a seat for the valving element. The sections of the collar are preferably deformable to permit insertion of the valving element into and its removal from the compartment.

The novel features which are considered as characteristic of the invention are set forth in particular in the appended claims. The improved machine itself, however, both as to its construction and the mode of assembling the same, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is a horizontal sectional view substantially as seen in the direction of arrows from the line III—III of FIG. 2;

FIG. 4 is an enlarged axial sectional view of the first conduit in the machine of FIG. 1 and of the adjacent portion of the top wall of the base, with one of the sealing elements installed in the recess of the top wall;

FIG. 5 is an elevational view of a modified conduit which can be utilized in lieu of the conduit of FIG. 4, a different position of the lower end portion of the conduit being indicated by phantom lines;

DESCRIPTION OF PREFERRED EMBODIMENTS

Figure 1:
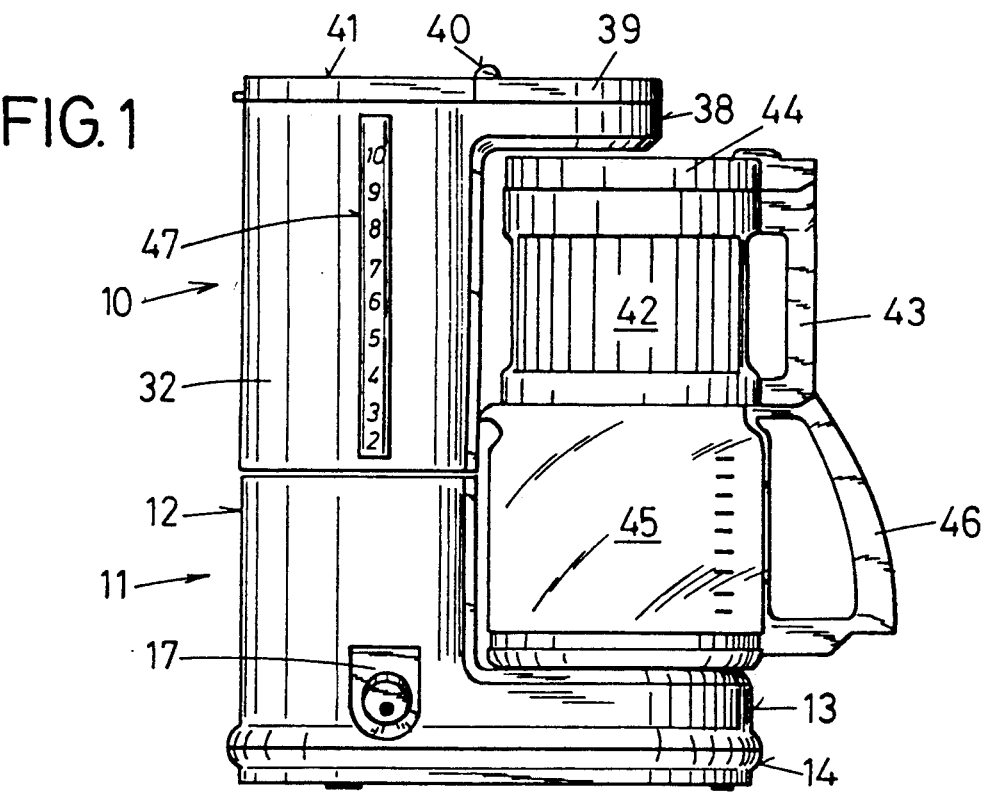
FIG. 1 is a schematic elevational view of a machine which embodies one form of the invention and can constitute a coffee maker.

The drawing shows only those parts of the improved machine which are necessary for complete understanding of the invention. For example, the drawing shows only one of a number of switching and control elements which are installed in and/or on the housing of the machine. Furthermore, the drawing does not show the details of the filter holder and/or all details of the electric heater for water, milk or another liquid which is to be heated prior to contacting a metered quantity of flavoring agent. All such parts which are not shown in the drawing but are necessary for proper operation of the illustrated machine can be identical with or analogous to corresponding parts of conventional machines, for example, of the above-enumerated commercially available makers which are produced and distributed by the assignee.

The machine 10 of FIGS. 1–4 can be used as a coffee maker and comprises a hollow housing in the form of a substantially L-shaped base 11 including an upright section 12 and a horizontal section 13. At least the section 13 is open at the underside of the base 11, and such underside is closed by a detachable bottom 14 having legs 15 (e.g., pieces of rubber or other elastomeric material) which contact the top of a counter, the top of a table or the top of another suitable support when the machine 10 is in use. The connection between the bottom 14 and the base 11 can comprise complementary male and female detent elements (not shown), one or more screws or bolts and/or any other suitable fasteners.

One end portion of an electric cable 16 extends into the internal space 18 of the base 11 through suitable cutouts or recesses which are provided therefor in the section 12 and in the bottom 14. The exposed end of the cable 16 carries a plug (not shown) which can be inserted into a household outlet or into another source of electrical energy. The confined end of the cable 16 is connected in circuit with the current-consuming and controlling components in the interior of the base 11. Such components include a conventional electric on-off switch 17 which is mounted on the front wall of the section 12 adjacent the section 13. If desired or necessary, the switch 17 can be combined with or installed adjacent a radiation source which lights up when the switch is on, i.e., when the machine 10 is ready for use.

Since the underside of the section 13 or the entire base 11 is open and the internal space 18 is accessible when the bottom 14 is detached or prior to attachment of the bottom, the base 11 can be fully assembled with all components which are to be confined in the space 18 and/or supported by the section 12 and/or 13 before the base is connected with a liquid storing and dispensing container 32 of the machine 10. The feature that a substantial part of or the entire internal space 18 is exposed upon detachment of the bottom 14 is desirable and advantageous on the additional ground that all of the components in the space 18 are readily accessible for inspection, repair or replacement.

The components in the base 11 include a first conduit 19, a second conduit 20, an electric heater 21 having a pipe 69 with an inlet connected to one end portion of the conduit 19 and an outlet connected with one end portion of the conduit 20, a warming plate 23 adjacent and above the heater 21, and a ring-shaped electrical insulator 22 which is mounted in the top portion of the section 13 and surrounds the marginal portion of the warming plate. The upper side of the marginal portion of the warming plate 23 is adjacent a ring-shaped seal 48 which is confined in an annular compartment of the insulator 22. Reference may be had to commonly owned copending patent application Ser. No. 474,153 filed Feb. 2, 1990 by Klaus Beumer this copending application fully describes one presently preferred mode of assembling the electric heater 21 with the warming plate 23, insulator 22 and seal 48, of installing such unit in the base, and of separably connecting a presently preferred bottom with the base upon completion of insertion of the aforementioned unit (including the parts 21–23 and 48) into the internal space 18.

The warming plate 23 serves to support the bottom wall of a vessel 45 (e.g., a coffee pot made of glass or another light-transmitting material) which, in turn, supports a filter holder 42 having a detachable or pivotably mounted top wall with a central opening beneath a horizontal extension 38 at the upper end of the container 32. The container is provided with a cover or lid including a fixedly mounted portion 39 above the extension 38, a pivotable portion 41 above the bottom wall 33 of the container, and a hinge 40 between the portions 39 and 41. The filter holder 42 is further provided with a handle 43, and the vessel 45 has a handle 46 as well as a graduated scale to indicate the quantity of freshly brewed beverage. A water level indicator 47 is provided on the upright section 12 of the base 11.

FIG. 4 shows one presently preferred embodiment of a conduit 19 which can be used in the machine 10 to establish communication between the inlet of the pipe 69 (i.e., the inlet of the electric heater 21) and a first nipple 34 which extends downwardly from the bottom wall 33 of the container 32. The lower end portion 65 of the conduit 19 is provided with a circumferentially extending external bead 66 which is introduced into the respective end portion of a sleeve-like elastic coupling device 67 (FIG. 3) when the conduit 19 is properly installed in the internal space 18 of the base 11. The other end portion of the coupling device 67 is slipped onto the inlet of the pipe 69. The bead 66 reduces the likelihood of accidental separation of the conduit 19 from the pipe 69.

The top wall 24 (FIG. 2) of the upright section 12 of the base 11 has a recessed portion 50 defining a substantially centrally located recess 100 above a bottom portion 51. A partition 52 divides the recess 100 into two sections each of which receives a discrete annular sealing element 26, 31. The upper end faces of the sealing elements 26, 31 extend to the level of the upper side 25 of the top wall 24. The bottom portion 51 has shoulders 53 serving as abutments for the lower end faces of the sealing elements 26 and 31. Still further, the bottom portion 51 has two openings 54 each of which is disposed above one of the shoulders 53 and each of which is in register with the respective sealing element 26 or 31. Furthermore, the openings 54 register with the upper ends of passages which are defined by two downwardly extending substantially cylindrical sleeves 56 which form integral parts of the bottom portion 51. The sleeves 56 have internal shoulders 56a which serve as rests or supports for external shoulders 55 of the upper end portions of the respective conduits 19, 20. Each upper end portion further comprises a second external shoulder 63 which abuts the lower end face 64 of the respective sleeve 56. Thus, once an upper end portion is installed in the respective sleeve 56 in such a way that its external shoulders 55, 63 respectively abut the shoulder 56a and the lower end face 64 of the corresponding sleeve 56, such upper end portion is reliably held against accidental axial movement upwardly above or downwardly beyond the position which is shown in FIG. 4. The material of the conduits 19, 20 and/or of the base 11 is sufficiently elastic to permit insertion of the upper end portions of the conduits into the respective sleeves 56 in a manner as shown in FIG. 4 for the upper end portion 30 of the conduit 19. The person in charge of inserting the upper end portion into the respective sleeve 56 can hear a click when the shoulder 55 comes to rest on the shoulder 56a and the shoulder 63 abuts the lower end face 64 of the corresponding sleeve 56.

When the upper end portion 30 of the conduit 19 of FIG. 4 is properly inserted into the respective sleeve 56, the upper part of this end portion extends into and occupies the lower part of the passage 73 in the respective sealing element 26. The upper part of the passage 73 is ready to receive the nipple 34 at the underside of the bottom wall 33 of the container 32. The sealing element 26 is dimensioned in such a way that it sealingly engages the properly inserted nipple 34 as well as the upper part of the properly inserted upper end portion 30 of the conduit 19.

The illustrated sealing elements 26 and 31 are identical, i.e., it is immaterial whether the sealing element 26 or 31 is installed above the opening 54 at the upper end of the sleeve 56 for the upper end portion 30 of the conduit 19. These sealing elements can be made of rubber or an elastomeric plastic material.

Figure 2:
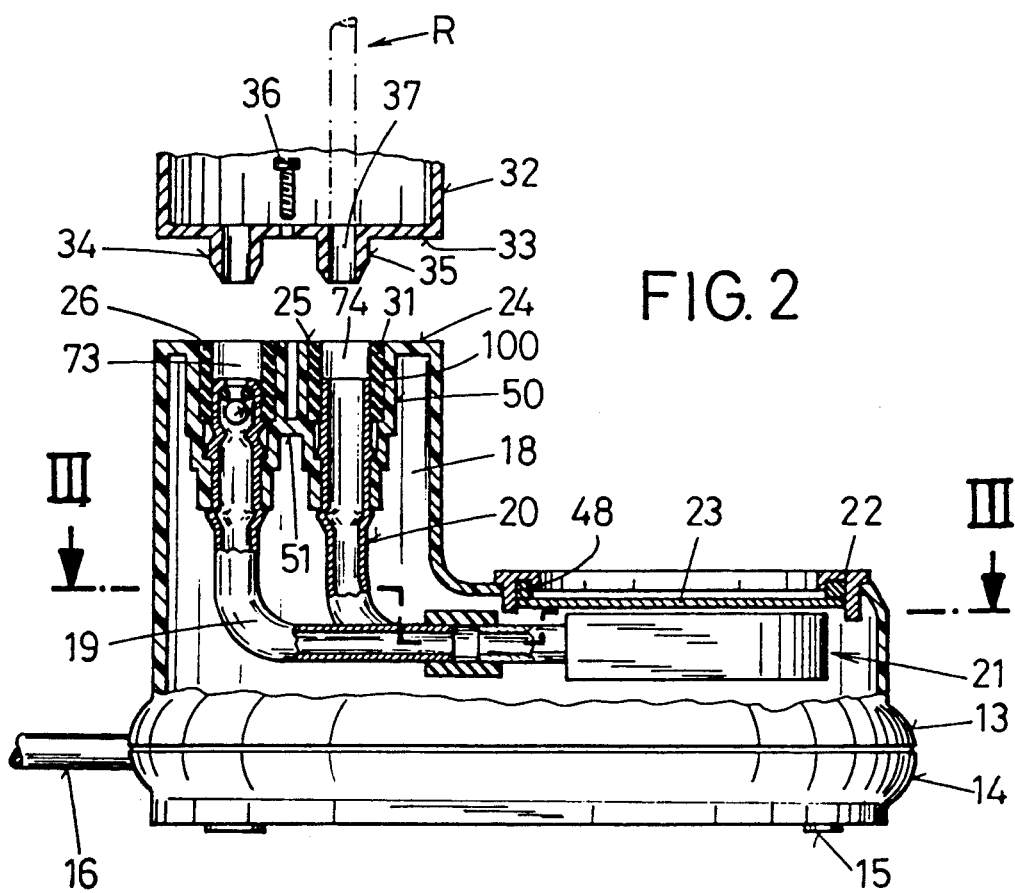
FIG. 2 is an enlarged partly elevational and partly vertical sectional view of the base in the machine of FIG. 1 and of certain components which are installed in its internal space, a portion of the container being shown above the base in a vertical sectional view.

The configuration of the upper end portion of the conduit 20 is different from that of the upper end portion 30 of the conduit 19. As can be seen in FIG. 2, the upper end portion of the conduit 20 is a tube with an open upper end which is located in the sealing element 31 substantially midway between the upper side 25 of the top wall 24 and the upper side of the bottom portion 51. The lower end portion of the conduit 20 is preferably identical with the lower end portion 65 of the conduit 19 and extends into a second sleeve-like elastomeric coupling device 68 which serves to separably connect the conduit 20 with the outlet of the pipe 69 (see FIG. 3). FIG. 2 shows that the upper end portion of the conduit 20 occupies the lower half of the passage 74 in the sealing element 31. The upper half of the passage 74 serves for reception of a second nipple 35 which is an integral part of and extends downwardly from the bottom wall 33 of the container 32. The passage 37 of the nipple 35 communicates with the lower end of a riser R (indicated in FIG. 2 by phantom lines) which serves to convey heated liquid and vapors (if any) into the extension 38 of the container 32. The extension 38 can define a chamber which receives hot liquid and has a discharge opening at a level above the preferably centrally located opening in the top wall 44 of the filter holder 42. Alternatively, the outlet of the riser R can discharge hot liquid directly into the opening in the top wall 44.

In accordance with a feature of the invention, the upper end portion 30 of the conduit 19 forms part of a check valve which further includes a spherical valving element 59 and a ring-shaped seat 60 for the valving element. The upper part of the end portion 30 can be said to constitute a cage which loosely receives the valving element 59. The cage defines a compartment 75 surrounded by a circumferentially complete wall 57 and receiving the valving element 59 with certain freedom of movement axially and transversely of the upper end portion 30. When the check valve is open, the valving element 59 rests on one or more inwardly extending projections 58 which preferably constitute integral portions of the wall 57 between the valving element 59 and the major part of the conduit 19. When the pressure in the conduit 19 rises above a permissible value so that heated liquid tends to flow from the pipe 69 of the electric heater 21 back into the container 32 via nipple 34, the rising liquid lifts the valving element 59 off the projection or projections 58 and moves the valving element into sealing engagement with the ring-shaped seat 60. The latter is held in the illustrated position by a radially inwardly extending collar 61 which constitutes the topmost part of the upper end portion 30 and defines a preferably circular opening 62 having a diameter larger than that of the valving element 59. On the other hand, the inner diameter of the ring-shaped seat 60 is smaller than the diameter of the valving element 59.

The collar 61 is disposed between the valving element 59 and the properly inserted nipple 34.

The valving element 59 is introduced into the compartment 75 within the wall 57 by way of the opening 62 in the collar 61 prior to insertion of the preferably deformable seat 60. Once the seat 60 is in place, it is held in the compartment 75 by the collar 61 and the end portion 30 of the conduit 19 is ready for insertion into the sealing element 26 by way of the respective sleeve 56 of the bottom portion 51. Alternatively, the check valve of FIG. 4 can employ a rigid or substantially rigid seat 60. The making of the collar 61 then follows insertion of the valving element 59 and seat 60 into the compartment 75. The seat 60 can be made of silicone.

An important advantage of the machine 10 of FIGS. 1 to 4 is that the base 11 can be fully assembled with the components which are installed in the internal space 18 and/or on the section 12 and/or 13 prior to insertion of nipples 34, 35 into the respective passages 73 and 74.

If desired or necessary, the container 32 can be positively connected with the base 11, for example, by employing a threaded fastener 36 (FIG. 2) having a head which abuts the upper side of the bottom wall 33 and an externally threaded shank in a tapped bore or hole of the top wall 24. The head of the fastener 36 is accessible when the portion 41 of the cover on top of the container 32 is pivoted to open position.

The filter holder 42 is of known design. Its internal space can receive a bag of filter paper for a metered quantity of flavoring agent such as tea leaves, pulverulent cocoa or chocolate, or ground coffee beans. The cover 44 of the filter holder 42 can be dimensioned in such a way that it can be placed on top of the vessel 45 when the brewing operation is completed and the filter holder is lifted off the vessel on the warming plate 23. The vessel 45 can be made of glass or another light transmitting material.

The transfer of freshly brewed beverage from the filter holder 42 into the vessel 45 can take place by way of a preferably centrally located outlet in the bottom wall of the filter holder or by way of one or more siphons, not shown. The scale on the body of the vessel 45 can be calibrated to indicate the number of cups which can be filled with the freshly brewed beverage in the vessel. The bottom wall of the vessel 45 is dimensioned in such a way that it can be deposited on the warming plate 23 and is then surrounded by the electrical insulator 22 which limits the extent of movability of the vessel along the upper side of the warming plate.

The temperature of the warming plate 23 can be regulated in any conventional way. FIG. 3 shows a commercially available thermostat 71 which forms part of the regulating means. The character 70 denotes one electric terminal of the heater 21.

The partition 52 in the recess 100 of the top wall 24 of the base 11 constitutes an optional feature. The purpose of this partition is to divide the recess 100 into at least two sections each of which serves for reception of one of the sealing elements 26 and 31. As mentioned above, the properly inserted sealing elements rest on the respective shoulders or abutments 53 of the bottom portion 51 beneath the recess 100.

The projections 58 can constitute separately produced parts which are inserted into and bonded or otherwise secured to the internal surface of the wall 57. It is preferred to provide projections 58 which are integral portions of the wall 57 because this contributes to simplicity and lower cost of the conduit 19. The configuration of the projections 53 is or can be such that they can be contacted by relatively large portions of the surface of the valving element 59 when the latter is in the inoperative position (i.e., away from the position—shown in FIG. 4—of sealing engagement with the seat 60). The seat 60 and the collar 61 can be provided with complementary male and female detent elements to ensure that the seat remains in contact with or close to the inner side of the collar. Alternatively, male or female detent means of the seat 60 can cooperate with female or male detent means at the inner side of the wall 57 in order to maintain the properly inserted seat in an optimum position with reference to the opening 62.

The shoulders 55 and 63 of the upper end portions of the conduits 19, 20 constitute optional but desirable features of these conduits. An advantage of the shoulders 63 is that they prevent or oppose excessive penetration of the upper end portions of conduits 19, 20 into the respective sleeves 56. The shoulders 55 exhibit the advantage that they prevent unintentional extraction of the upper end portions of conduits 19, 20 from the respective sleeves 56.

FIG. 5 shows a modified conduit 19 which can be used in lieu of the similarly referenced conduit of FIG. 4. The difference is that the median portion 72 of the conduit 19 of FIG. 5 is flexible so that the lower half of the conduit can be bent from the solid-line position to the phantom-line position of FIG. 5. It is clear that the angle between the two halves of the conduit can be greater than or less than 90 degrees, depending upon the orientation of the sleeves 56 relative to the end portions of the pipe 69. In the embodiment of FIG. 5, the median portion 72 is provided with a set of annular corrugations which contribute to its flexibility. Alternatively, the wall thickness of the median portion 72 can be less than the wall thickness of the two end portions of the conduit so that the flexibility of the median portion is attributable to its weakening in the region where the conduit is likely to be flexed for the purpose of establishing a path for the flow of fresh liquid from the nipple 34 of the container 32 to the inlet of the pipe 69. The other conduit (corresponding to the conduit 20 of FIGS. 2 and 3) can be rendered flexible in the same way as the conduit 19 of FIG. 5; however, such other conduit need not form part of a check valve. The check valve which includes the upper end portion of the conduit 19 of FIG. 5 is or can be identical with the check valve of FIG. 4.

Figure 6:
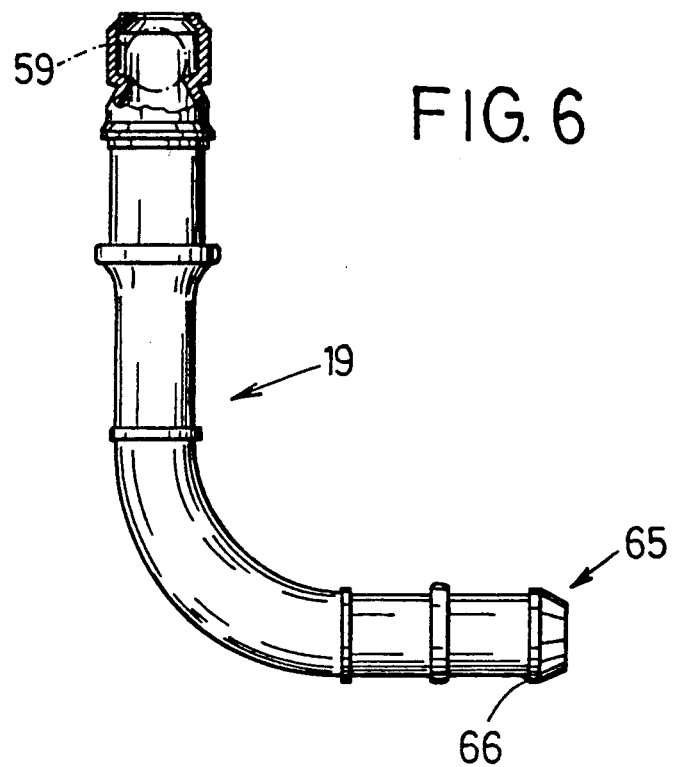
FIG. 6 is a partly elevational and partly axial sectional view of a further conduit.
Figure 7:
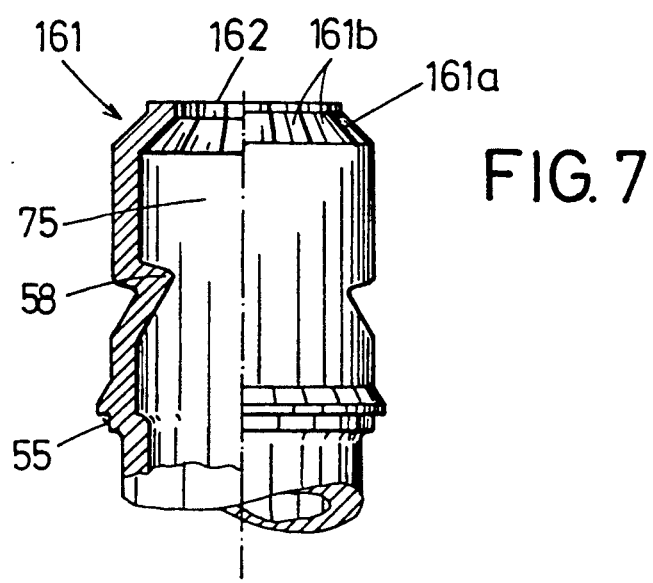
FIG. 7 is an enlarged partly elevational and partly axial sectional view of the upper end portion of the conduit which is shown in FIG. 6.

FIGS. 6 and 7 show a further conduit 19 which can be used in the base 11 of FIGS. 1 to 3 to convey liquid from the container 32 to the inlet of the pipe 69 forming part of the electric heater 21. The upper end portion of this conduit again defines a cage for the spherical valving element 59 in the compartment 75. The discrete ring-shaped seat 60 of FIG. 4 is omitted because the collar 161 consists of a plurality of arcuate sections 161b alternating with slits 161a. This renders it possible to flex the sections 161a radially outwardly and to thus enlarge the diameter of the opening 162 so that it exceeds the diameter of the valving element 59. When the sections 161a are released, they reassume the illustrated positions so that the diameter of the opening 162 is reduced below the diameter of the inserted valving element 59. The collar 161 then constitutes a seat for the valving element 59 to prevent hot liquid from flowing from the lower end portion 65 toward and out of the opening 162. The conduit 19 of FIGS. 6 and 7 can be made of a springy metallic or plastic material, and its median portion may but need not be corrugated as the median portion 72 of the conduit 19 of FIG. 5. The projection or projections 58 prevent the valving element 59 from leaving the compartment 75 and they establish paths for the flow of liquid from the opening 162 toward the lower end portion 65 even when they are actually contacted by the valving element.

An important advantage of the assembly including the base 11 and the components which are mounted in the internal space 18 and on the sections 12 and 13 (such components include the container 32 as well as the conduits 19, 20, the sealing elements 26, 31, the electric heater 21, the warming plate 23 (if the latter is assembled with the heater 21 prior to introduction into the internal space 18) and the check valve) is that such assembly need not embody a separately produced check valve. Instead, a portion of the conduit 19 forms part of the check valve which, in its simplest form, consists of a valving element 59 and of the upper end portion 30 of the conduit 19 (see FIGS. 6 and 7).

Another important advantage of the improved machine is that the base 11 can be fully assembled with all other components save for the container 32 before the sealing elements 26, 31 receive the respective nipples 34, 35. Thus, it is not necessary to affix the container 32 to the base 11 prior to completion of installation of the conduits 19 and 20 in the internal space 18. This simplifies the assembly of the machine and entails considerable savings in time.

The improved machine is susceptible of many additional modifications. For example, the upper end portion 30 of the conduit 19 can assume a shape which departs from those shown in FIGS. 4 to 7 as long as it can be said to form part of the check valve and thus contributes to simplicity and lower cost of the machine. As mentioned above, the end portion 30 of the conduit 19 can be said to constitute a cage for the valving element 59 so that it is not necessary to produce a discrete cage. All that is necessary is to employ a valving element and, if necessary, to employ the discrete seat 60 of FIG. 4 if the collar at the top of the end portion 30 is not designed in a manner as described with reference to FIGS. 6 and 7. The configuration and/or the number of projections 58 can be varied as long as such projections ensure that the valving element remains confined in the compartment 75 and permits fresh liquid to flow from the container 32 into the pipe 69 unless the valving element is caused to engage the seat 60 or 161.

The configuration of sealing elements 26 and 31 can also depart from that of the simple cylindrical sealing elements which are shown in FIGS. 2 and 4. Reference may be had to our commonly owned copending patent application Ser. No. 474,166 filed Feb. 2, 1990 which describes and shows several types of sealing elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine for brewing hot beverages comprising a hollow base including a top wall having an upper side provided with at least one recess, said top wall including a bottom portion beneath said recess and said bottom portion having first and second openings; first and second annular sealing elements disposed in said recess in register with the respective openings, said top wall having a partition dividing said recess into first and second sections for the respective sealing elements; a liquid storing container including a bottom wall adjacent said top wall and having first and second nipples extending into and sealingly engaging the respective sealing elements; an electric heater disposed in said base and having a liquid admitting inlet and a liquid discharging outlet; a first conduit having a first end portion connected with said inlet and a second end portion in said first sealing element; a check value provided in said top wall and including the second end portion of said first conduit; a second conduit having a first end portion connected to said outlet and a second end portion in said second sealing element; and a riser provided in said container and having a liquid-receiving lower end in communication with said second nipple.

2. The machine of claim 1, wherein the second end portion of said first conduit defines a compartment and said valve comprises a valving element in said compartment.

3. The machine of claim 2, wherein the second end portion of said first conduit includes a circumferentially complete annular wall surrounding said compartment and having at least one stop projecting into said compartment between said valving element and the first end portion of said first conduit.

4. The machine of claim 3, wherein said annular wall has an inwardly extending collar defining a liquid admitting opening between said first nipple and said valving element.

5. The machine of claim 4, wherein said valving element is a ball and said collar has an inner diameter greater than the diameter of said ball.

6. The machine of claim 5, wherein said valve further comprises an annular seat disposed in said compartment adjacent said collar.

7. The machine of claim 1, wherein said at least one recess is disposed substantially centrally of said top wall and said bottom portion has first and second sleeves beneath the respective openings, the second end portions of said conduits extending through the respective sleeves.

8. The machine of claim 7, wherein said sleeves have internal shoulders and the second end portions of said conduits have external shoulders resting on the respective internal shoulders.

9. The machine of claim 7, wherein said sleeves have lower end faces and said conduits have external shoulders abutting the respective lower end faces.

10. The machine of claim 1, wherein said bottom portion has abutments for said sealing elements.

11. The machine of claim 1, wherein at least one of said conduits has a flexible portion between the respective first and second end portions.

12. The machine of claim 11, wherein said flexible portion has annular corrugations.

13. A machine for brewing hot beverages comprising a hollow base including a top wall having an upper side provided with at least one recess, said top wall including a bottom portion beneath said recess and said bottom portion having first and second openings; first and second annular sealing elements disposed in said recess in register with the respective openings; a liquid storing container including a bottom wall adjacent said top wall and having first and second nipples extending into and sealingly engaging the respective sealing elements; an electric heater disposed in said base and having a liquid admitting inlet and a liquid discharging outlet; a first conduit having a first end portion connected with said inlet and a second end portion in said first sealing element, said second end portion defining a compartment and having an inwardly extending collar above said compartment, said collar comprising arcuate sections and slots between said sections; a check valve provided in said top wall and including the second end portion of said first conduit, said valve further including a spherical valving element in said compartment and said collar constituting a seat for said valving element; a second conduit having a first end portion connected to said outlet and a second end portion in said second sealing element; and a riser provided in said container and having a liquid-receiving lower end in communication with said second nipple.

14. The machine of claim 13, wherein the sections of said collar are deformable to permit insertion of said valving element into and removal of said valving element from said compartment.

15. A machine for brewing hot beverages comprising a hollow base including a top wall having an upper side provided with at least one recess, said top wall including a bottom portion beneath said recess and said bottom portion having first and second openings; first and second annular sealing elements disposed in said recess in register with the respective openings; a liquid storing container including a bottom wall adjacent said top wall and having first and second nipples extending into and sealingly engaging the respective sealing elements; an electric heater disposed in said base and having a liquid admitting inlet and a liquid discharging outlet; a first conduit having a first end portion connected with said inlet and a second end portion in said first sealing element, at least the second end portion of said first conduit being resilient; a check valve provided in said top wall and including the second end portion of said first conduit; a second conduit having a first end portion connected to said outlet and a second end portion in said second sealing element; and a riser provided in said container and having a liquid-receiving lower end in communication with said second nipple.

* * * * *